US012285770B2

(12) United States Patent
Yan

(10) Patent No.: US 12,285,770 B2
(45) Date of Patent: Apr. 29, 2025

(54) SHOWERING APPARATUS WITH SPRAY HOLES EACH ACCOMMODATING MULTIPLE SPRAY PATTERNS

(71) Applicant: Xiamen Galenpoo Kitchen & Bathroom Technology Co, Ltd., Fujian (CN)

(72) Inventor: Xiaoling Yan, Xiamen (CN)

( * ) Notice: Subject to any disclaimer, the term of this patent is extended or adjusted under 35 U.S.C. 154(b) by 374 days.

(21) Appl. No.: 18/079,892

(22) Filed: Dec. 13, 2022

(65) Prior Publication Data

US 2024/0189836 A1 Jun. 13, 2024

(51) Int. Cl.
*B05B 1/12* (2006.01)
*B05B 1/18* (2006.01)

(52) U.S. Cl.
CPC ................ *B05B 1/12* (2013.01); *B05B 1/185* (2013.01)

(58) Field of Classification Search
CPC ....... B05B 1/12; B05B 1/1636; B05B 1/1645; B05B 1/1654; B05B 1/169; B05B 1/18; B05B 1/185
See application file for complete search history.

(56) References Cited

U.S. PATENT DOCUMENTS 11,192,125 B2 * 12/2021 Chung .................. B05B 1/3053
2018/0243764 A1 * 8/2018 Lin ........................... B05B 1/16
2021/0078020 A1 * 3/2021 Wang .................... B05B 1/3086
2021/0121897 A1 * 4/2021 Lin ....................... B05B 12/002
2023/0405613 A1 * 12/2023 Liu ......................... B05B 1/185

FOREIGN PATENT DOCUMENTS

CN 113171892 A * 7/2021 ............... B05B 1/12
DE 20111056 U1 * 9/2001 ........... B05B 1/1654
EP 3578268 A1 * 12/2019 ............... B05B 1/12

* cited by examiner

*Primary Examiner* — Darren W Gorman

(57) ABSTRACT

A showering apparatus with spray holes each accommodating multiple spray patterns includes a main body, a control assembly, and a plurality of selector discs. The main body includes an outlet disc having the spray holes, a water passage plate, and an outlet chamber defined by the both. The selector disc is fit in the outlet chamber and has at least two pattern units for providing different spray patterns. The control assembly is transmissively connected to each of the selector discs to drive each of the selector discs to rotate, so that each of the pattern units in every selector disc is selectively communicated with spray hole corresponding to the selector disc.

14 Claims, 19 Drawing Sheets

SHOWERING APPARATUS WITH SPRAY HOLES EACH ACCOMMODATING MULTIPLE SPRAY PATTERNS

BACKGROUND OF THE INVENTION

1. Technical Field

The present invention relates to bathroom equipment, and more particularly to a showering apparatus with spray holes each accommodating multiple spray patterns.

2. Description of Related Art

Shower heads play an important role in the modern lifestyle. With the improvement of the quality of life, people demand more and more from shower heads. For example, people have different preferences in spray patterns provided by shower heads. While some people prefer mist, others like a waterfall shower or a rain shower.

In order to satisfy various user needs, a conventional shower head may have several sets of spray holes, each of which is for a different spray pattern so that a user can make selection from these sets according to his/her preference. Although the prior art is successful in meeting different user needs, it has some limitations. First, every set of spray holes is specific to a different spray pattern. This means a single shower head has to be equipped with a large number of spray holes, yet only a small part of them is used for each spray pattern, making the effective spray area always small with respect to the total area of the spray area. To have a shower head satisfying in terms of both spray pattern and spray area, an exaggerated outlet disc has to be used to accommodate the many spray holes as required. However, the resulting shower head tend to have a compromised appearance for being bulky and complicated.

SUMMARY OF THE INVENTION

The objective of the present invention is to provide a showering apparatus with spray holes each accommodating multiple spray patterns, wherein every spray hole is configured to provide at least two different spray patterns.

To achieve the aforementioned objective, the present invention adopts the following solutions:

a showering apparatus with spray holes each accommodating multiple spray patterns, the showering apparatus comprising: a main body, a control assembly, and a plurality of selector discs; the main body including an outlet disc and a water passage plate that are connected, the outlet disc and the water passage plate jointly defining an outlet chamber therebetween, the outlet disc being formed with the spray holes; each of the selector discs being rotatably fit inside the outlet chamber, and having at least two pattern units for providing different spray patterns, each of the pattern units in the selector disc being communicated with the outlet chamber, each of the selector discs being configured to correspond to one of the spray holes, and each of the pattern units in each of the selector discs being movably communicated with the spray hole corresponding to the selector disc; the control assembly being assembled to the main body, the control assembly being transmissively connected to each of the selector discs, the control assembly driving each of the selector discs to rotate, so that each of the pattern units in each of the selector discs being selectively communicated with the spray hole corresponding to the selector disc.

Therein, a sealing assembly is sandwiched between the selector discs and the outlet disc.

Therein, a sealing assembly is sandwiched between each of the selector discs and the outlet disc.

Therein, the sealing assembly comprises a sealing band, and the sealing band of the sealing assembly sandwiched between each of the selector discs and the outlet disc encircles the spray hole corresponding to the selector disc.

Therein, the sealing assembly further comprises a sealing ring connected to the sealing band, and the sealing ring of the sealing assembly sandwiched between each of the selector discs and the outlet disc encircles a center of rotation of the selector disc.

Therein, the outlet disc has recesses for the sealing bands of the sealing assemblies to be partially inlaid therein.

Therein, an elastic retaining member is arranged between each of the selector discs and the water passage plate.

Therein, the elastic retaining member is a spring structure, and the selector disc has a retaining portion for being engaged with the elastic retaining member.

Therein, the outlet disc of the main body has a shaft for each of the selector discs, and each of the selector discs is rotatably mounted around the corresponding shaft.

Therein, the control assembly is rotatably installed inside the main body, and the control assembly has a transmission portion formed with transmission teeth, so that the transmission portion of the control assembly is engaged with at least one of the selector discs through the switch teeth and the transmission teeth.

Therein, a gear-positioning mechanism is arranged between the main body and the control assembly, in which the gear-positioning mechanism comprises a spring-pin assembly incorporated in the control assembly and a plurality of gear slots formed on the main body, so that in response to relative rotation between the main body and the control assembly, the spring-pin assembly is engaged with each of the gear slots in position successively.

Therein, the outlet disc of the main body has an installation hole for the control assembly to pass therethrough rotatably and an elastic ring is fit between the control assembly and a wall of the installation hole.

Therein, the main body further comprises a water inlet plate connected to the outlet disc and the water passage plate, and the water inlet plate and the water passage plate jointly define an inlet chamber therebetween, in which the water inlet plate has a water inlet communicated with the inlet chamber and the water passage plate has a plurality of water passage holes communicating the inlet chamber with the outlet chamber.

With the technical schemes described previously, the control assembly of the present invention drives each of the selector discs to rotate, so that each of the pattern units of the selector disc selectively is communicated with the spray hole corresponding to the selector disc. In addition, the selector disc has at least two pattern units for providing different spray patterns, so that when the control assembly is operated to selectively communicate the different pattern units of the selector disc with the spray hole corresponding to the selector disc, showers of different spray patterns can be produced at the spray hole 111. In other words, every spray hole is configured to alternatively output at least two different spray patterns. This eliminates the need that the outlet disc provides spray holes specific to each individual spray pattern, thereby allowing the outlet disc and in turn the overall showering apparatus to be made compact. Besides, with the foregoing configuration, the spray area for every spray pattern can be maximized to cover all the spray holes across the outlet disc.

DETAILED DESCRIPTION OF THE INVENTION

The present invention will be further explained with reference to some specific embodiments.

Embodiment 1

Figure 1:
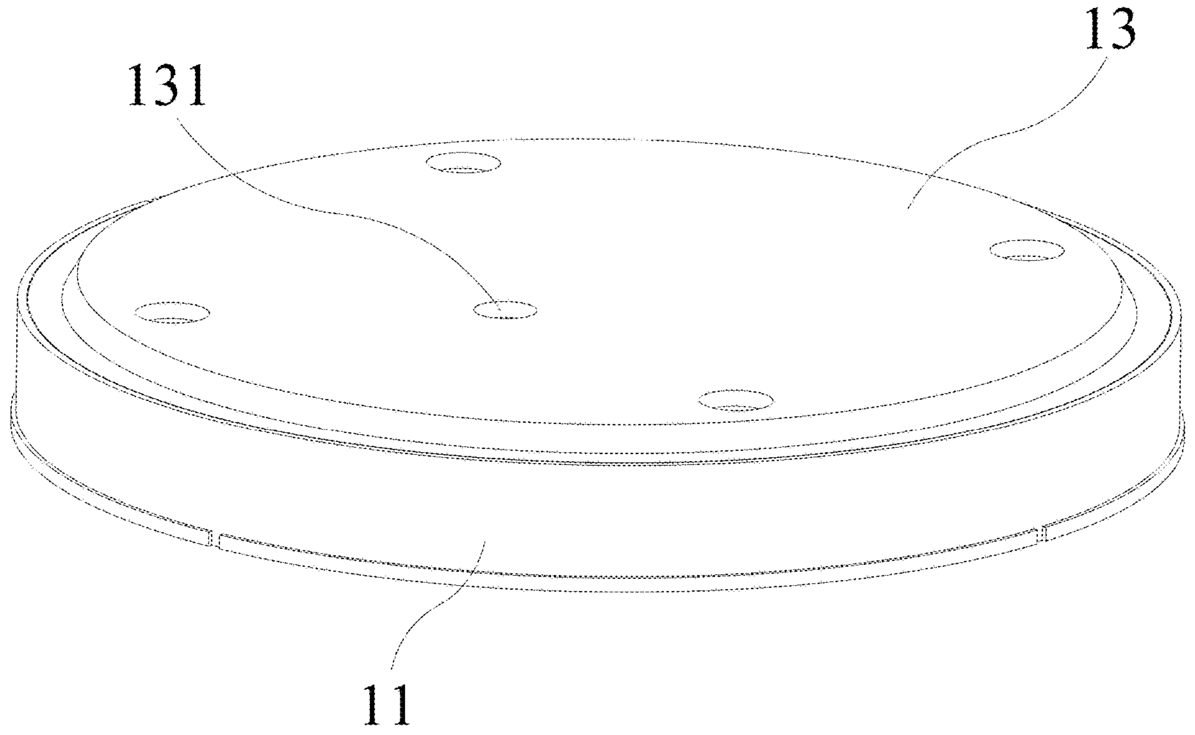
FIG. 1 is a perspective view of one embodiment of the present invention.
Figure 2:
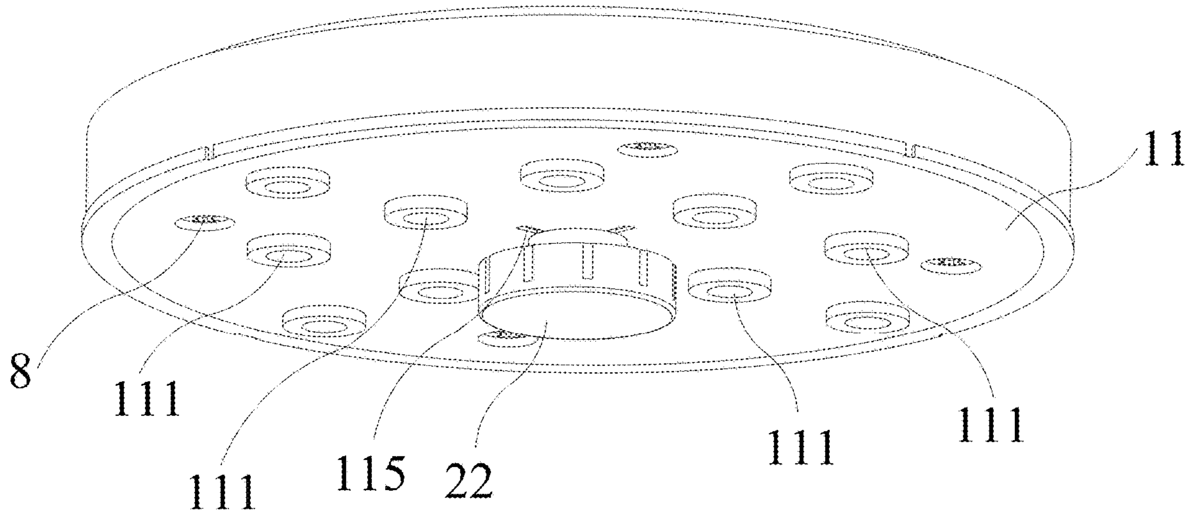
FIG. 2 is another perspective of the first embodiment of the present invention.
Figure 3:
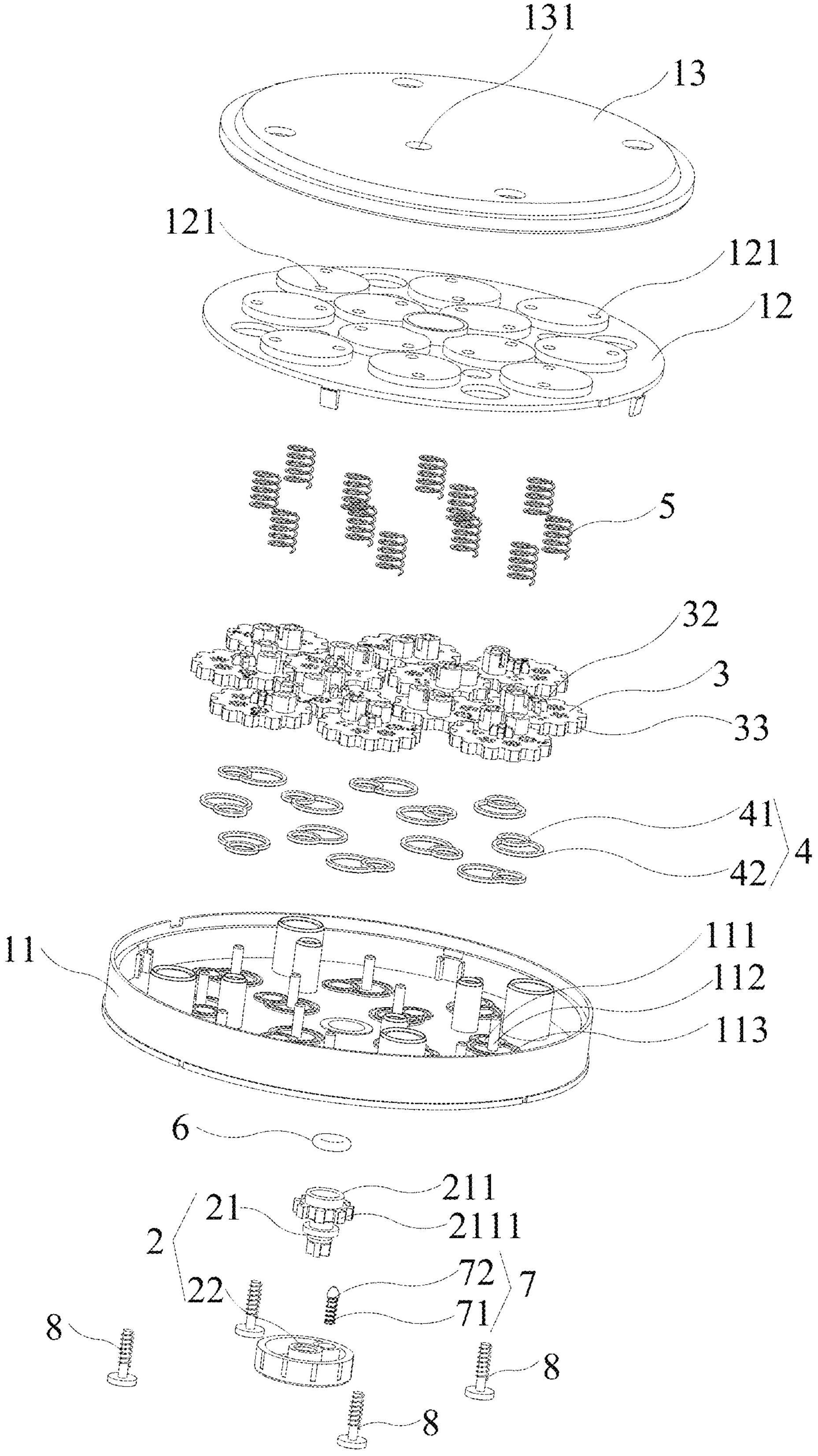
FIG. 3 is an exploded view of the first embodiment of the present invention.
Figure 4:
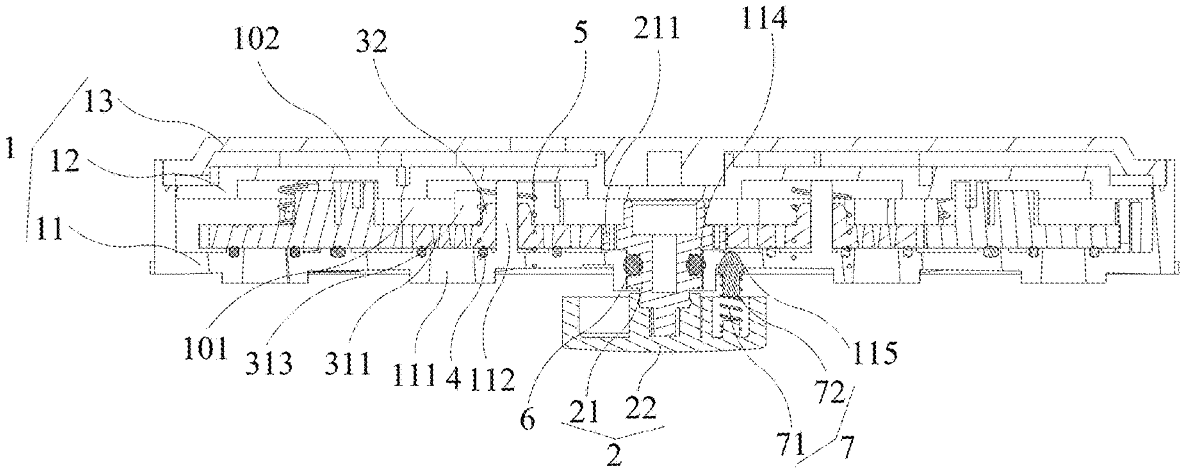
FIG. 4 is a cross-sectional view of the first embodiment of the present invention.
Figure 5:
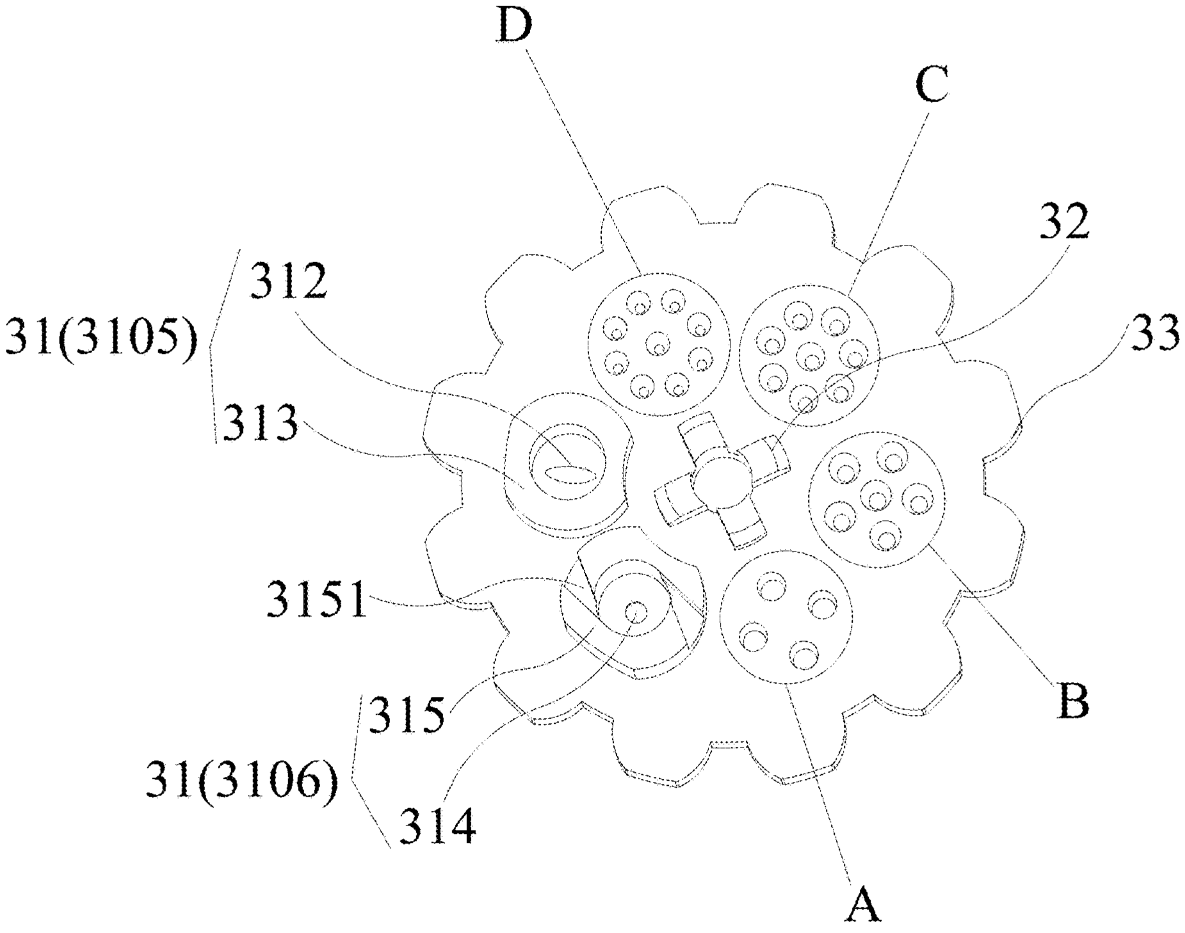
FIG. 5 is a perspective view of a selector disc used in the first embodiment of the present invention.
Figure 6:
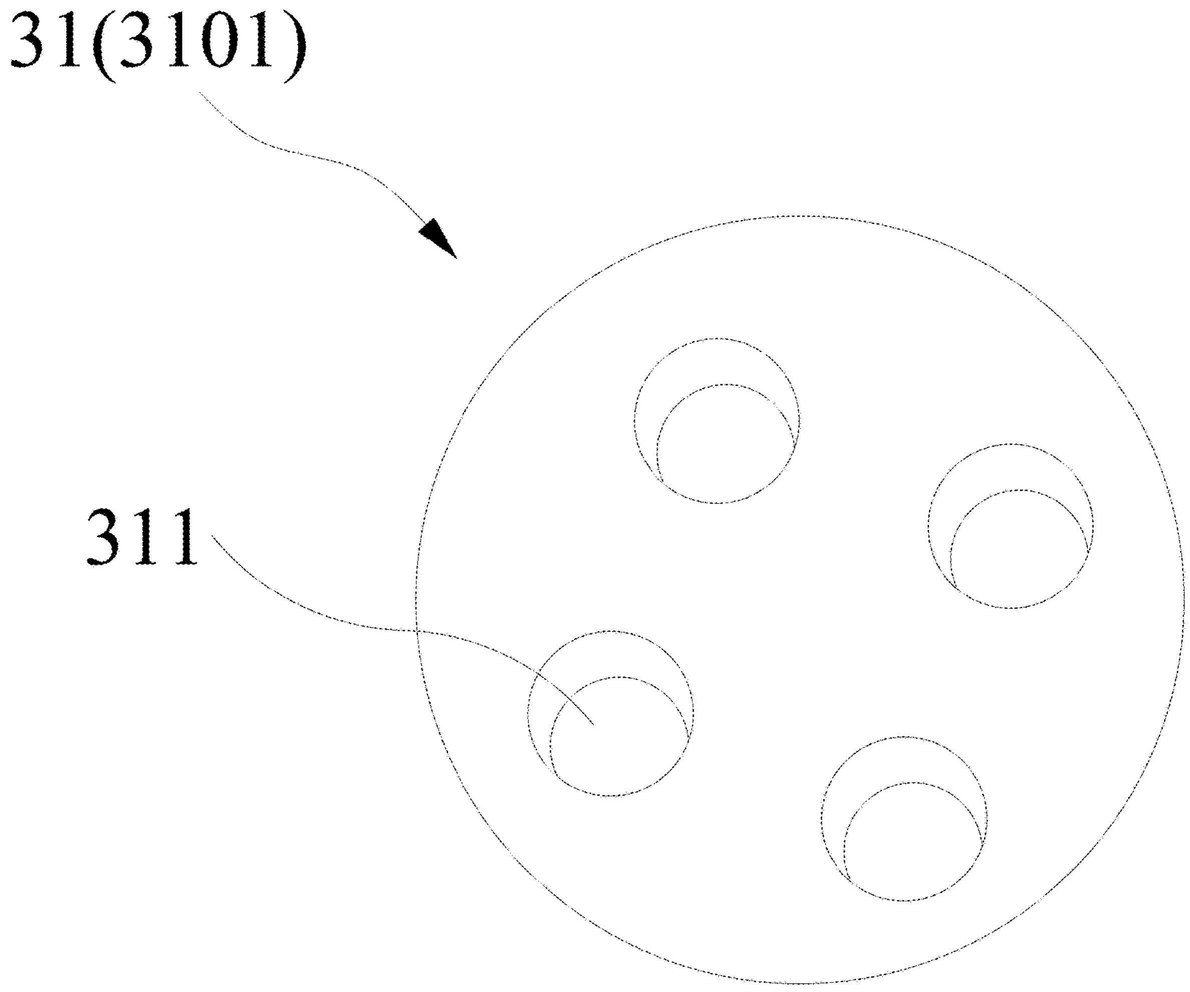
FIG. 6 is a partial close-up view of Part A in FIG. 5.
Figure 7:
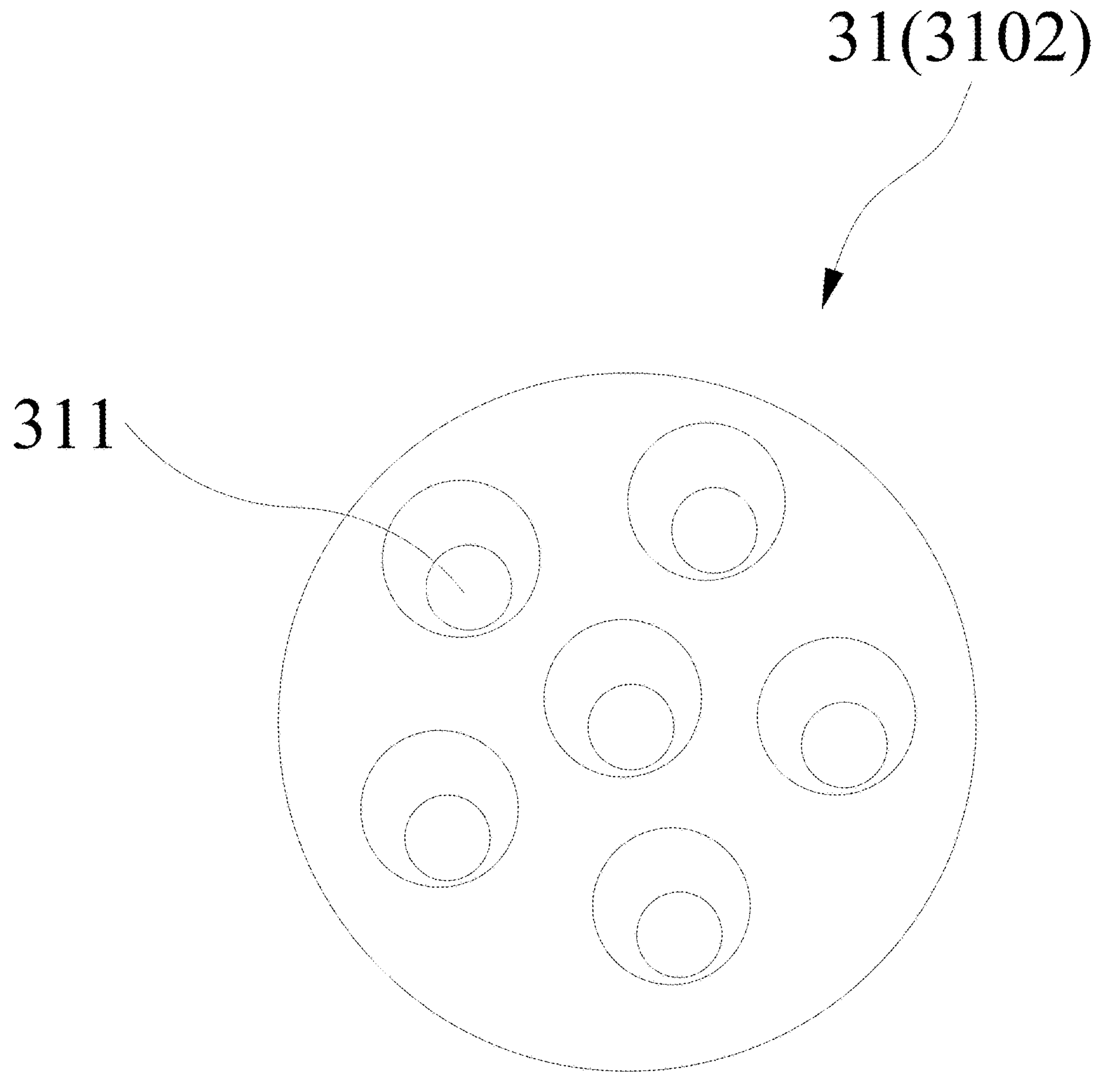
FIG. 7 is a partial close-up view of Part B in FIG. 5.
Figure 8:
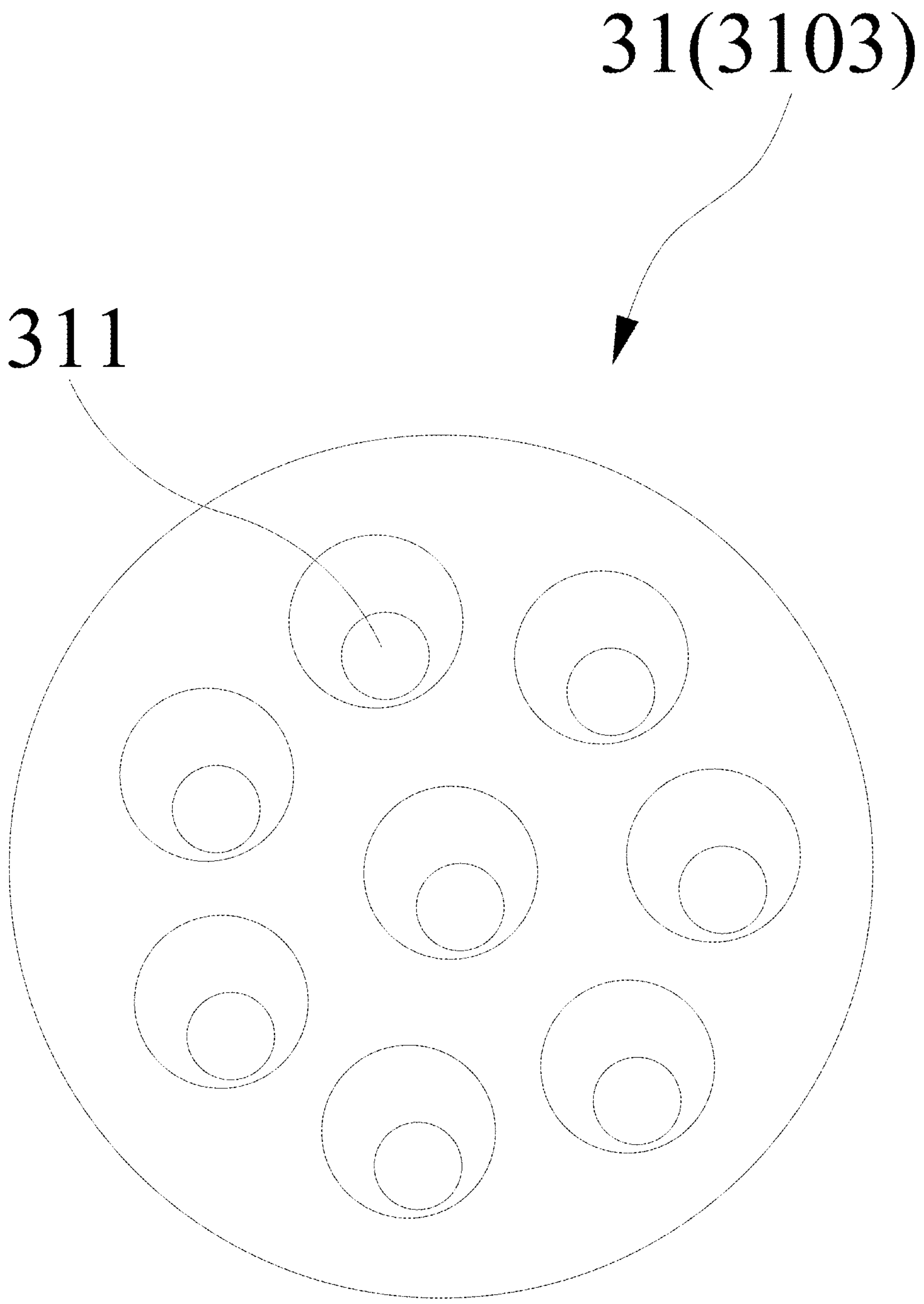
FIG. 8 is a partial close-up view of Part C in FIG. 5.
Figure 9:
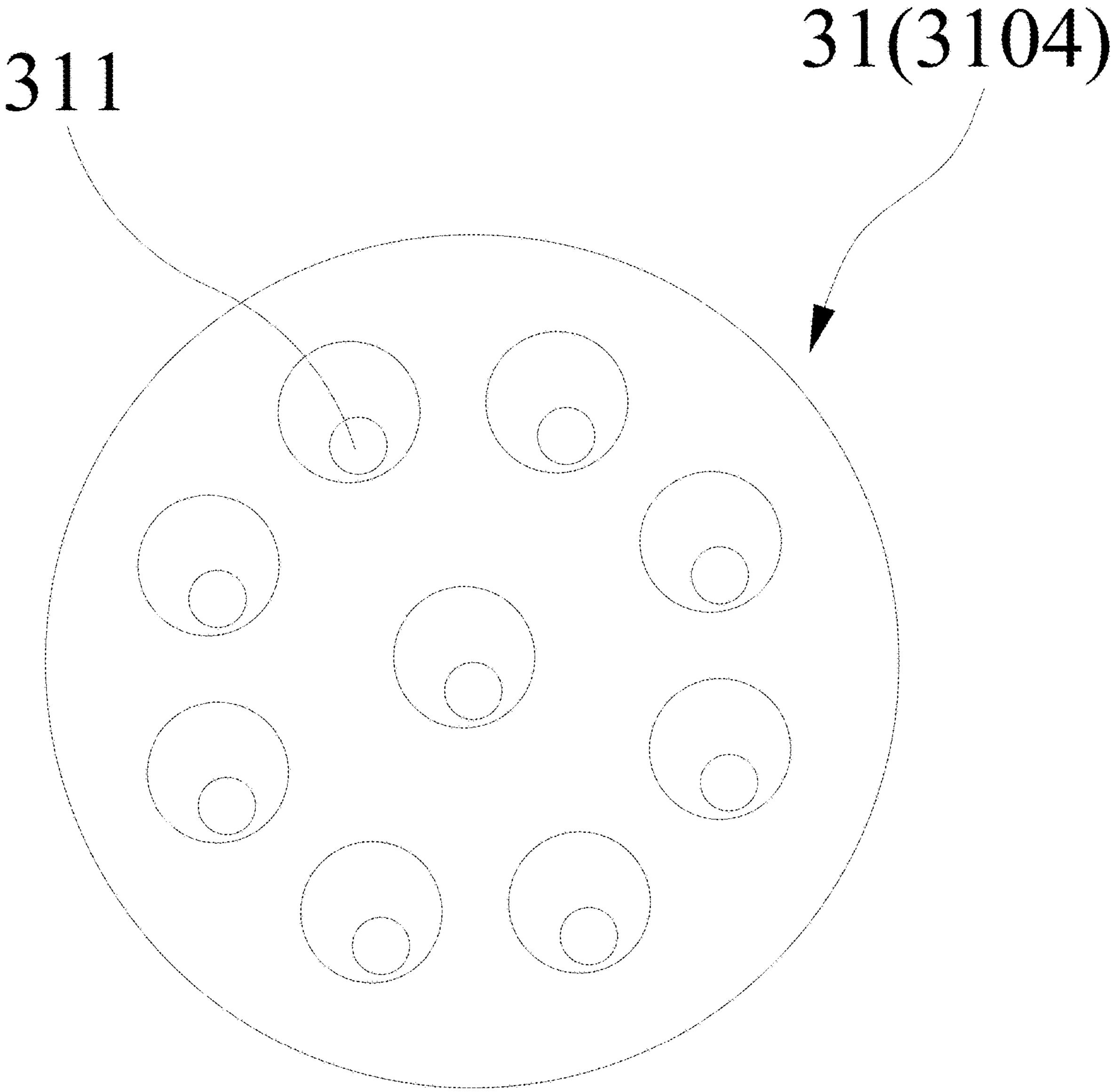
FIG. 9 is a partial close-up view of Part D in FIG. 5.
Figure 10:
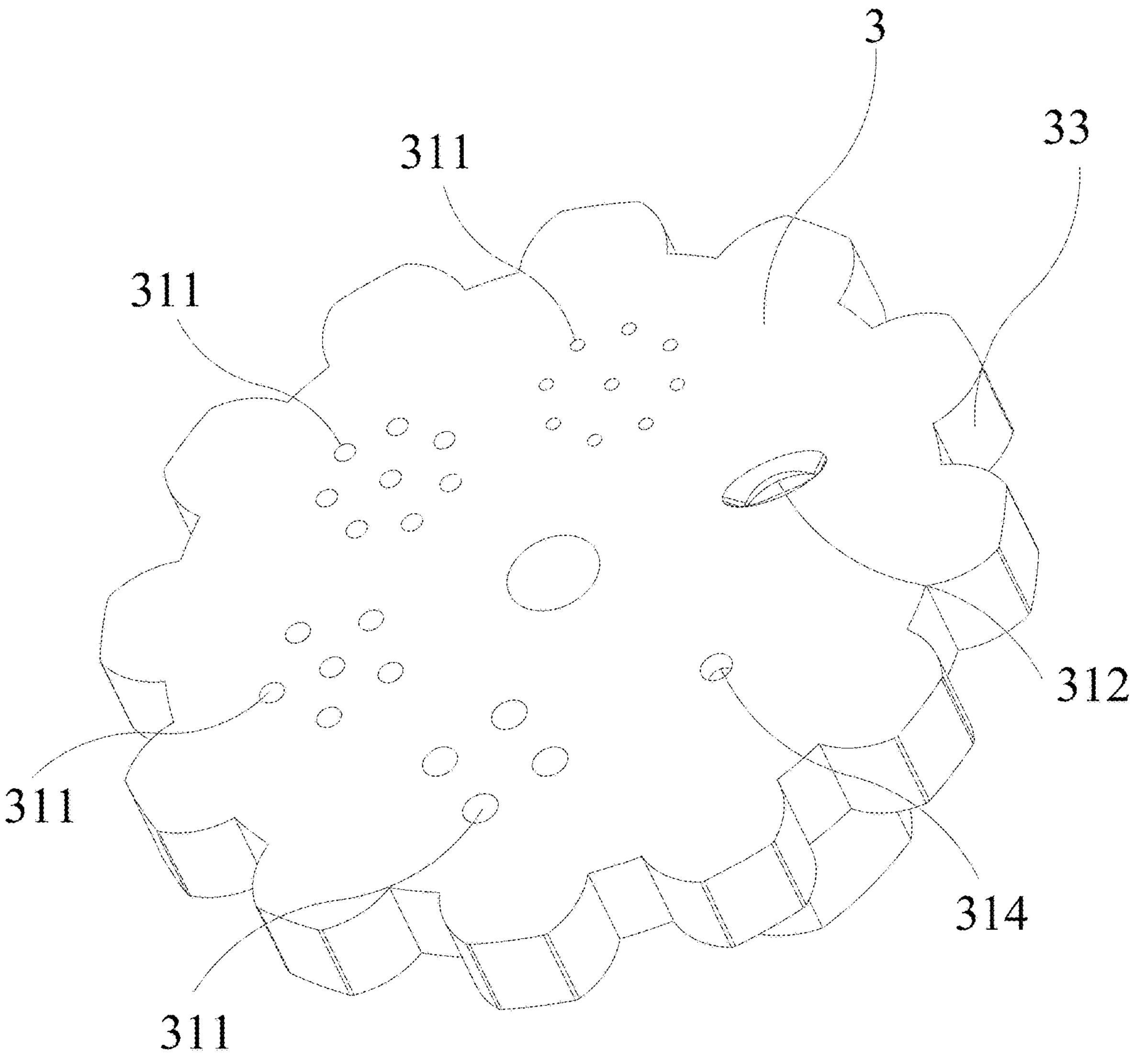
FIG. 10 is another perspective of the selector disc used in the first embodiment of the present invention.

As shown in FIG. 1 through FIG. 10, in the first embodiment of the present invention, the disclosed showering apparatus with spray holes each accommodating multiple spray patterns comprises a main body 1, a control assembly 2, and a plurality of selector discs 3. The main body 1 includes an outlet disc 11 and a water passage plate 12 that are connected. The outlet disc 11 and the water passage plate 12 jointly define an outlet chamber 101 therebetween. The outlet disc 11 is formed with the spray holes 111. Each of the selector discs 3 is rotatably fit inside the outlet chamber 101. The selector disc 3 has at least two pattern units 31 for providing different spray patterns. Each of the pattern units 31 in the selector disc 3 is communicated with the outlet chamber 101. Every selector disc 3 is configured to correspond to one of the spray holes 111, and each of the pattern units 31 in every selector disc 3 is movably communicated with the spray hole 111 corresponding to the selector disc 3. The control assembly 2 is assembled to the main body 1. The control assembly 2 is transmissively connected to each of the selector discs 3. The control assembly 2 drives each of the selector discs 3 to rotate, so that each of the pattern units 31 in every selector disc 3 is selectively communicated with the spray hole 111 corresponding to the selector disc 3.

In the first embodiment of the present invention, the disclosed control assembly 2 drives each of the selector discs 3 to rotate to make each of the pattern units 31 in the selector disc 3 selectively communicated with the spray hole 111 corresponding to the selector disc 3. The selector disc 3 has at least two pattern units 31 for providing different spray patterns. Thereby, when the control assembly 2 is operated to selectively communicate the different pattern units 31 of the selector disc 3 with the spray hole 111 corresponding to the selector disc 3, showers of different spray patterns can be produced at the spray hole 111. In other words, every spray hole is configured to alternatively output at least two different spray patterns. This eliminates the need that the outlet disc 11 provides spray holes 111 specific to each individual spray pattern, thereby allowing the outlet disc 11 and in turn the overall showering apparatus to be made compact. Besides, with the foregoing configuration, the spray area for every spray pattern can be maximized to cover all the spray holes 111 across the outlet disc 11.

In the first embodiment of the present invention, the outlet disc 11 of the main body 1 has a shaft 112 for each of the selector discs 3. Every selector disc 3 is rotatably mounted around a shaft 112 so as to rotatably install the selector disc 3 inside the outlet chamber 101. It is to be noted that the shafts 112 are unnecessarily arranged on the outlet disc 11. Alternatively, the shafts 112 may be configured on the water passage plate 12.

In the first embodiment of the present invention, at least one sealing assembly 4 is sandwiched between the selector discs 3 and the outlet disc 11 for preventing leakage. Specifically, a sealing assembly 4 is sandwiched between each of the selector discs 3 and the outlet disc 11. The sealing assembly 4 comprises a sealing band 41. The sealing band 41 of the sealing assembly 4 sandwiched between each of the selector discs 3 and the outlet disc 11 encircles the spray hole 111 corresponding to the selector disc 3. The sealing band 41 effectively prevents water from leaking between the selector disc 3 and the outlet disc 11. The sealing assembly 4 further comprises a sealing ring 42 connected to the sealing band 41. The sealing ring 42 of the sealing assembly 4 sandwiched between each of the selector discs 3 and the outlet disc 11 encircles a center of rotation of the selector disc 3. The sealing ring 42 ensures that the selector disc 3 with an evenly exerted force and thus prevents the selector disc 3 from undesirable tilt. As a result, the selector disc 3 can rotate smoothly and the sealing band 41 can effectively prevent leakage between the selector disc 3 and the outlet disc 11. The outlet disc 11 may have recesses 113 for the sealing bands 41 of the sealing assemblies 4 to partially inlaid therein, so as to well hold the sealing assembly 4 in position. It is to be noted that the present invention may alternatively prevent leakage using a single sealing assembly 4 sandwiched between all of the selector discs 3 and the outlet disc 11, wherein the sealing assembly 4 has openings each aligned with a spray hole 111.

In the first embodiment of the present invention, an elastic retaining member 5 is arranged between each of the selector discs 3 and the water passage plate 12. The elastic retaining member 5 normally exerts a force on the selector disc 3 to prevent displacement of the selector disc 3. Also the force exerted by the elastic retaining member 5 onto the selector disc 3 ensures that the selector disc 3 always abuts against the sealing assembly 4, thereby eliminating leakage between the selector disc 3 and the outlet disc 11. The elastic retaining member 5 may be a spring structure, and the selector disc 3 may have a retaining portion 32 for being engaged with the elastic retaining member 5 so as to prevent displacement of the elastic retaining member 5.

In the first embodiment of the present invention, each of the selector discs 3 is peripherally formed with switch teeth 33. Each of the selector discs 3 is engaged with its adjacent counterparts, so as to ensure that all the selector discs 3 rotate synchronously and in turn ensure consistence of the spray pattern among all of the spray holes 11. This also allows self-locking of the selector discs 3, thereby ensuring that the spray pattern is formed at all of the spray holes 11 stably.

In the first embodiment of the present invention, the selector disc 3 may have six pattern units 31, including a first pattern unit 3101, a second pattern unit 3102, a third pattern unit 3103, and a fourth pattern unit 3104, each having a plurality of water outlet apertures 311. The first pattern unit 3101, the second pattern unit 3102, the third pattern unit 3103, and the fourth pattern unit 3104 may have different numbers, arrangements, and diameters of water outlet apertures 311, so that the first pattern unit 3101, the second pattern unit 3102, the third pattern unit 3103, and the fourth pattern unit 3104 can provide showers of four different spray patterns, respectively. A fifth pattern unit 3105 has an elliptical flat-stream mouth 312 and a raised circumference 313 encircling the flat-stream mouth 312, so that the fifth pattern unit 3105 can produce a flat stream. A sixth pattern unit 3106 has a water outlet 314 and a retaining wall 315 encircling the water outlet 314. The retaining wall 315 has at least two oblique channels 3151 passing therethrough, so that sixth pattern unit 3106 can produce a shower with an expanded spray coverage.

In the first embodiment of the present invention, the control assembly 2 may be rotatably installed inside the main body 1. The control assembly 2 has a transmission portion 211 formed with transmission teeth 2111. The transmission portion 211 of the control assembly 2 is engaged with at least one of the selector discs 3, so that when the control assembly 2 rotates, it drives all of the selector discs 3 to rotate. The outlet disc 11 of the main body 1 has an installation hole 114 for the control assembly 2 to pass therethrough rotatably and to fasten the control assembly 2 to the outlet disc 11 of the main body 1 rotatably. An elastic ring 6 is fit between the control assembly 2 and the wall of the installation hole 114 for preventing leakage. The transmission portion 211 of the control assembly 2 is a gear structure and is accommodated inside the outlet chamber 101. The transmission portion 211 of the control assembly 2 is engaged with the selector discs 3. It is to be noted that instead of being rotatably fit in the outlet disc 11 of the main body 1, the control assembly 2 may alternatively rotatably arranged between the outlet disc 11 of the main body 1 and the water passage plate 12. In this case, the transmission portion 211 of the control assembly 2 is a ring gear that has its teeth engaged with the selector disc(s) 3.

In the first embodiment of the present invention, a gear-positioning mechanism is provided between the main body 1 and the control assembly 2. The gear-positioning mechanism comprises a spring-pin assembly 7 incorporated in the control assembly 2 and a plurality of gear slots 115 formed on the main body 1. In response to relative rotation between the main body 1 and the control assembly 2, the spring-pin assembly 7 is engaged with each of the gear slots 115 in position successively. With the gear-positioning mechanism, a user can easily and rapidly switch between different spray patterns with gear-shift feeling. Specifically, the control assembly 2 may comprise a lever 21 and a knob 22 connected to the lever 21. The lever 21 rotatably passes through the installation hole 114 and has the transmission portion 211. The spring-pin assembly 7 comprises a spring 71 and a pin 72. The spring-pin assembly 7 is installed at the knob 22 of the control assembly 2 and the gear slots 115 are formed on the outlet disc 11 of the main body 1. The spring 71 props between the pin 72 and the knob 22 with a spring force. It is to be noted that instead of having the spring-pin assembly 7 and the gear slots 115 incorporated in the control assembly 2 and the main body 1 respectively, the gear-positioning mechanism may alternatively have the spring-pin assembly 7 and the gear slot 115 arranged in the main body 1 and the control assembly 2, respectively.

In the first embodiment of the present invention, the main body 1 further comprises a water inlet plate 13 connected to the outlet disc 11 and the water passage plate 12. The water inlet plate 13 and the water passage plate 12 jointly define an inlet chamber 102 therebetween. The water inlet plate 13 has a water inlet 131 communicated with the inlet chamber 102 and the water passage plate 12 has a plurality of water passage holes 121 communicating the inlet chamber 102 with the outlet chamber 101, so that water enters the inlet chamber 102 and then enters the outlet chamber 101 from the inlet chamber 102. The water passage plate 12 is formed with the plural water passage holes 121 so as to secure the outlet chamber 101 with a sufficient water flow and thereby ensure a sufficient water flow at the spray holes 111. The water inlet 131 of the water inlet plate 13 is adapted to a water supply pipe. Therein, the outlet disc 11 and the water passage plate 12 of the main body 1 may be combined in a snap-fit manner, and the outlet disc 11 is fixed to the water inlet plate 13 by means of screws 8 passing through the water passage plate 12.

The disclosed showering apparatus with spray holes each accommodating multiple spray patterns is applicable to overhead shower heads, detachable shower heads or kitchen shower heads. Therein, the main body 1 is connected to the main body of an overhead shower head, a detachable shower head, or a kitchen shower head.

Embodiment 2

Figure 11:
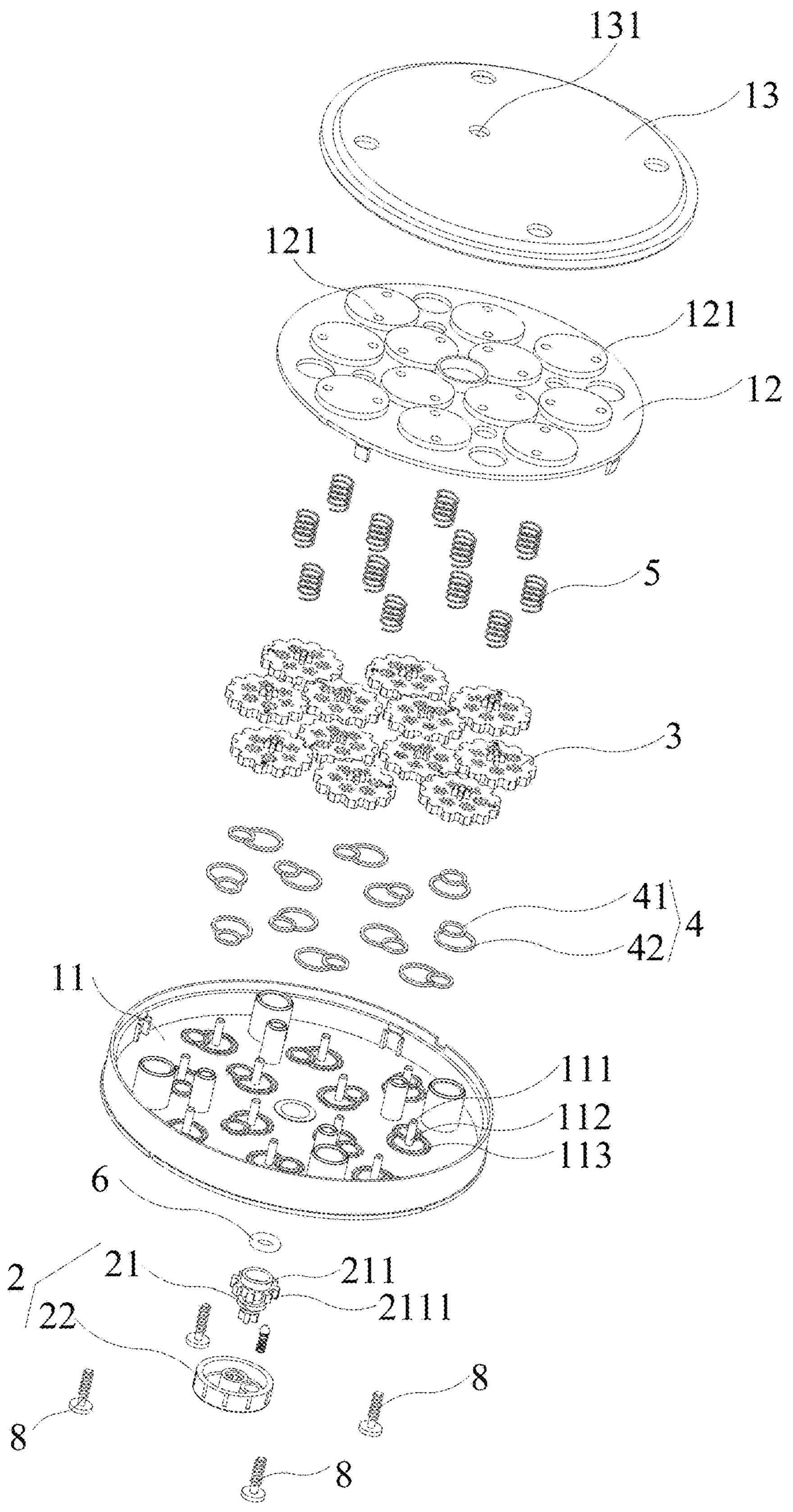
FIG. 11 is an exploded view of another embodiment of the present invention.
Figure 12:
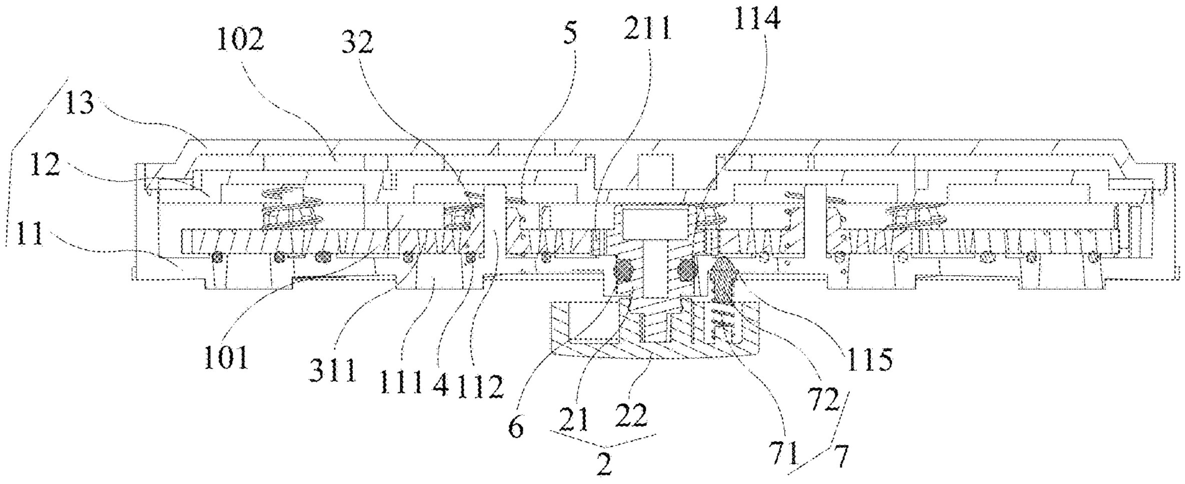
FIG. 12 is a cross-sectional view of the second embodiment of the present invention.
Figure 13:
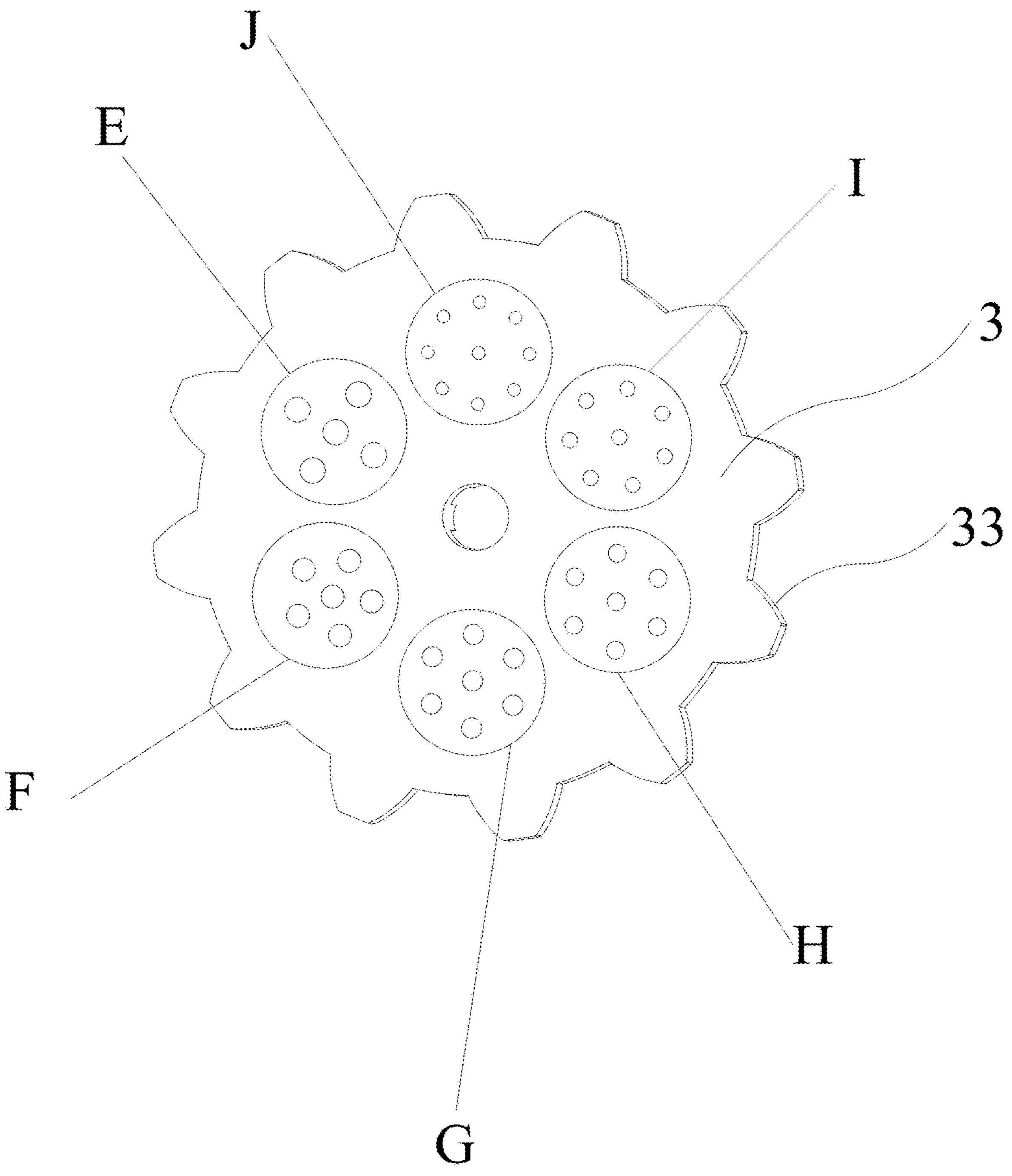
FIG. 13 is a perspective view of a selector disc used in the second embodiment of the present invention.
Figure 14:
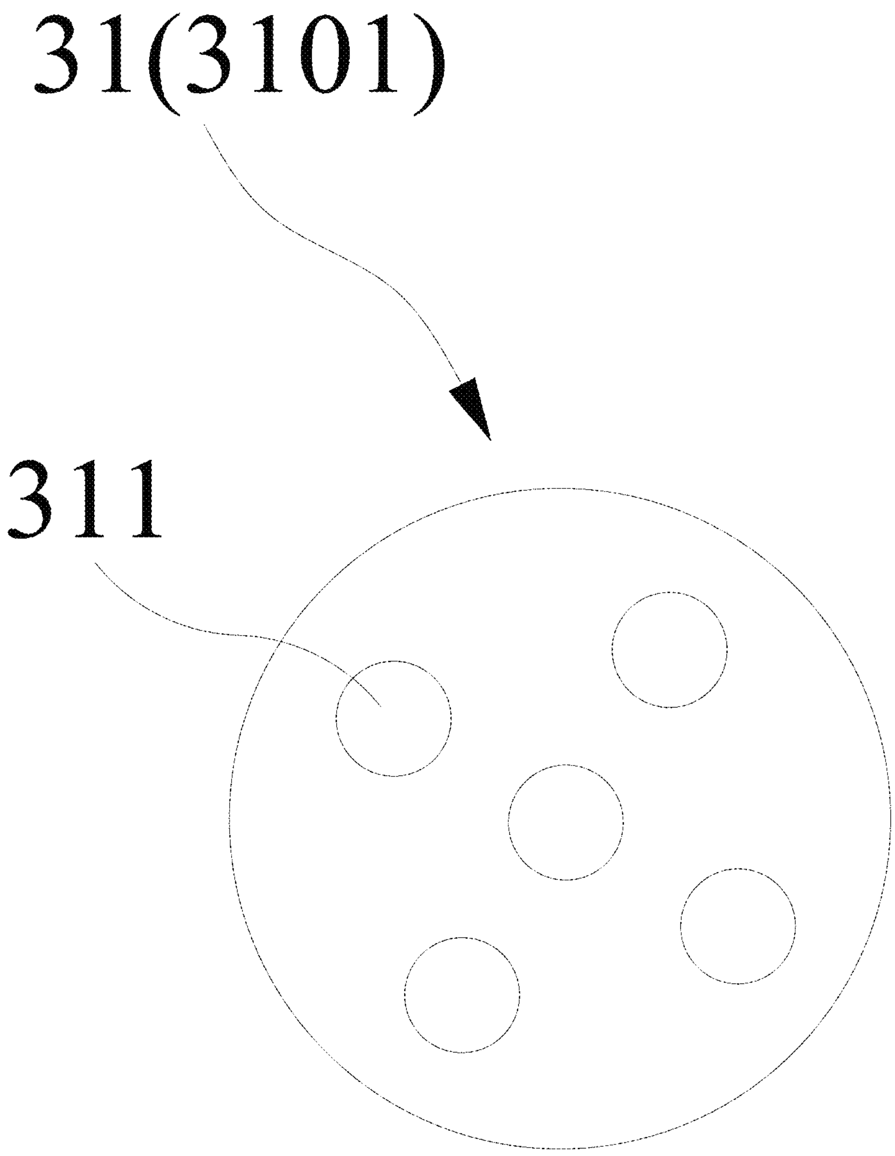
FIG. 14 is a partial close-up view of Part E in FIG. 13.
Figure 15:
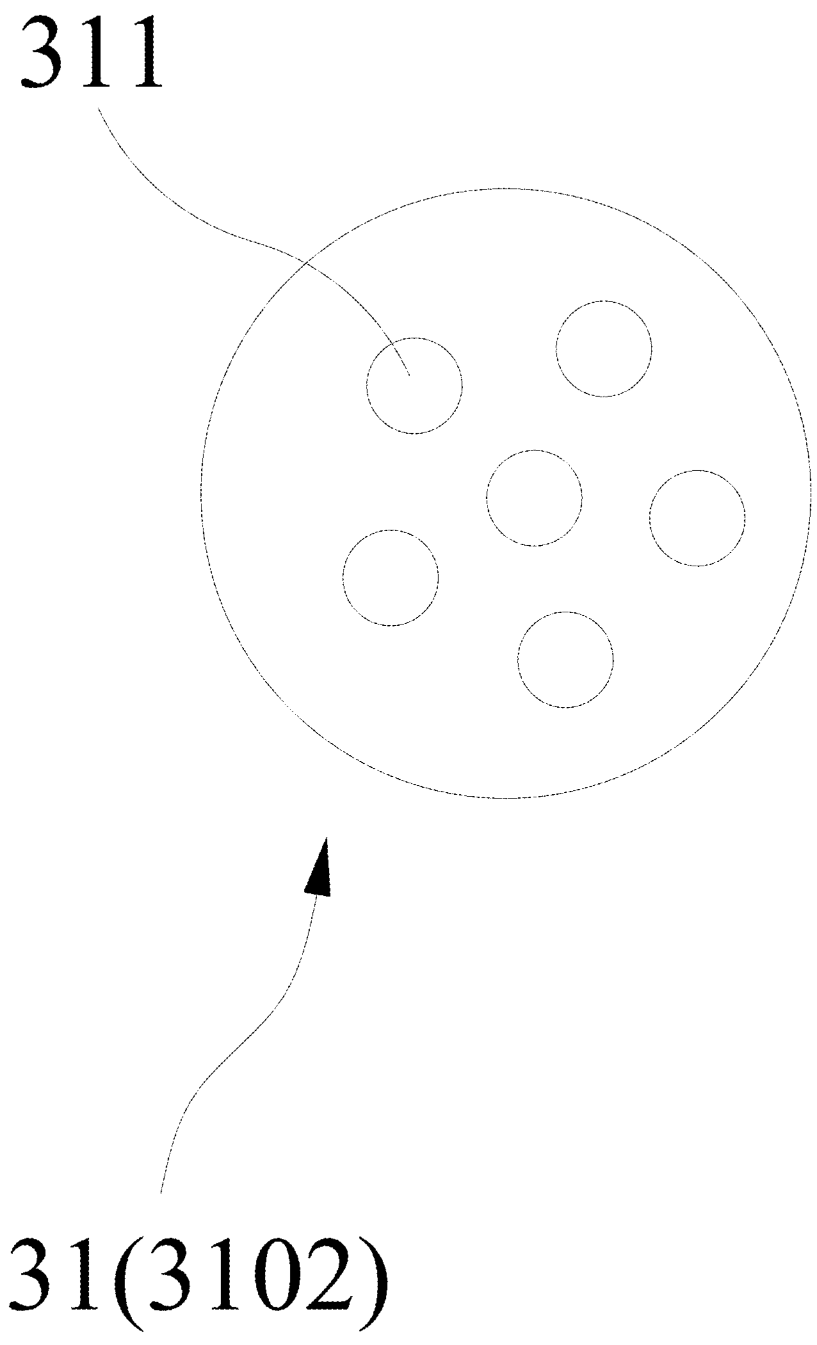
FIG. 15 is a partial close-up view of Part F in FIG. 13.
Figure 16:
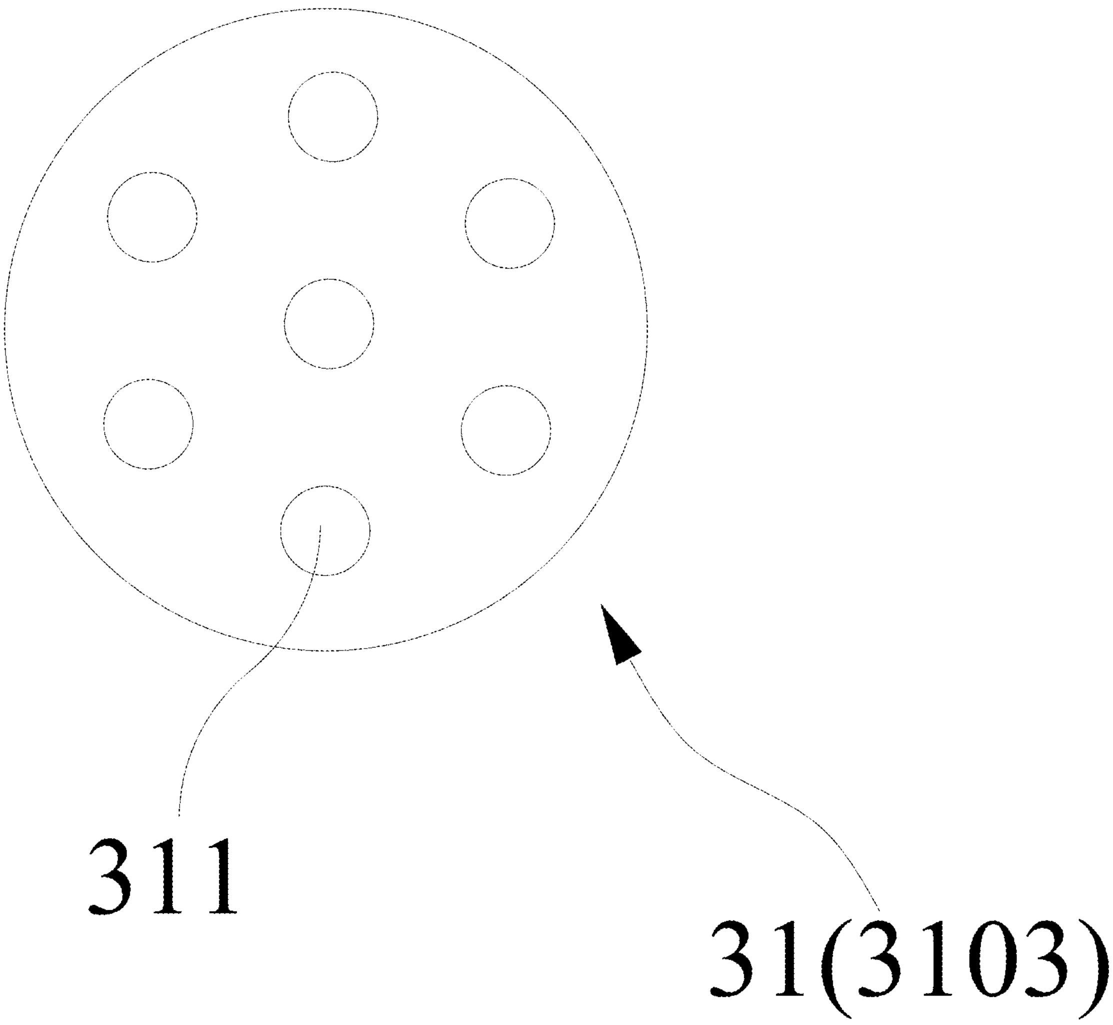
FIG. 16 is a partial close-up view of Part G in FIG. 13.
Figure 17:
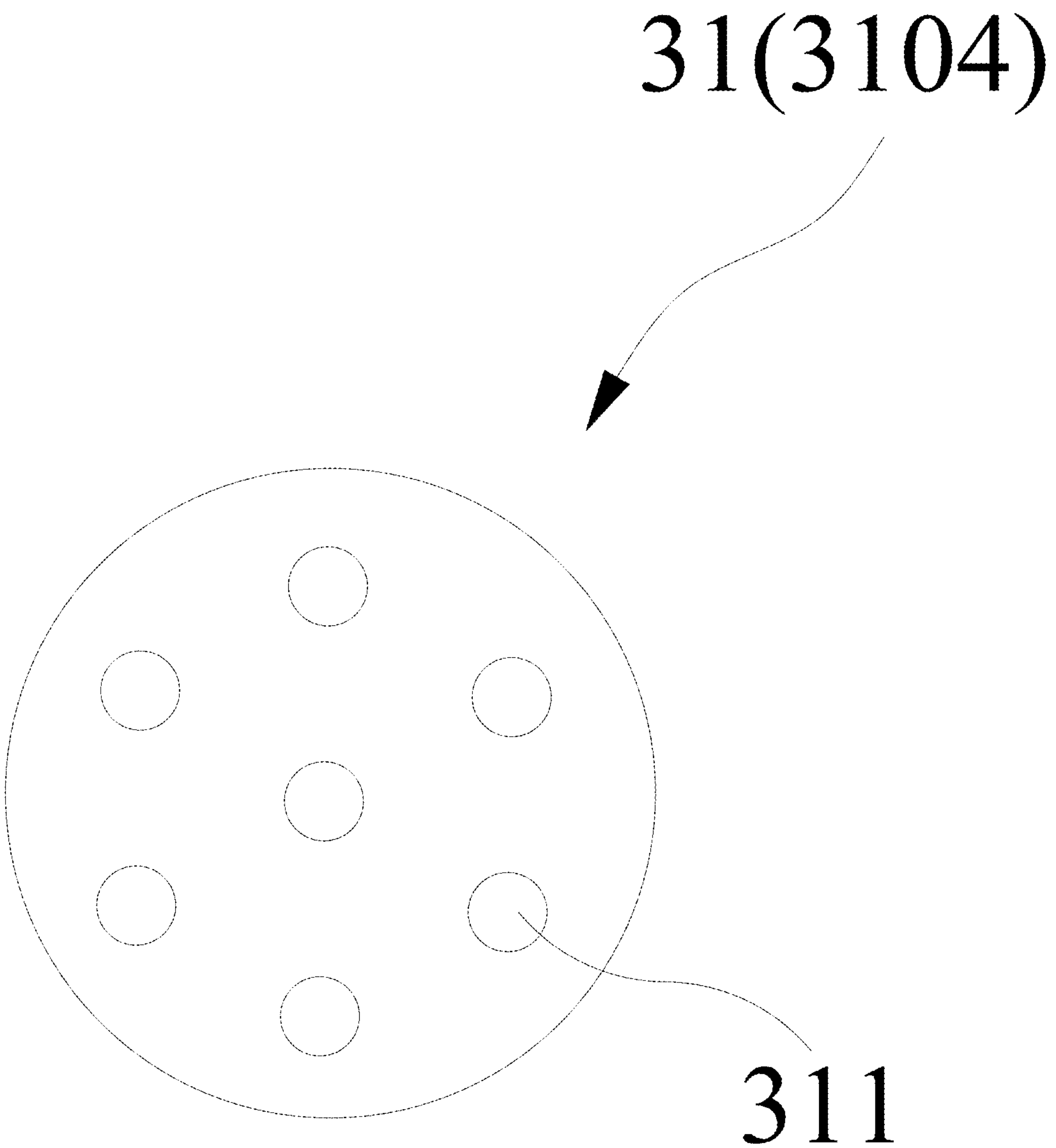
FIG. 17 is a partial close-up view of Part H in FIG. 13.
Figure 18:
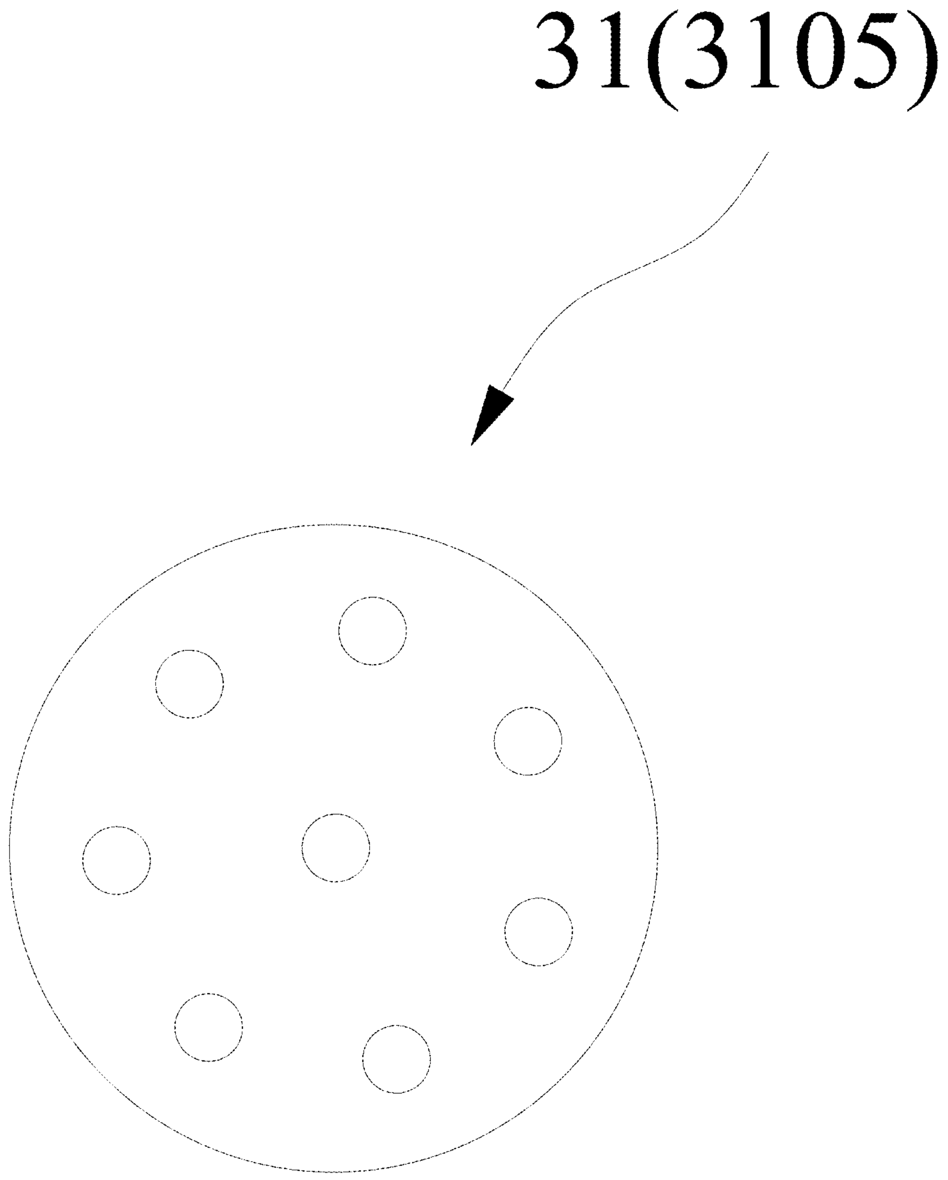
FIG. 18 is a partial close-up view of Part I in FIG. 13.
Figure 19:
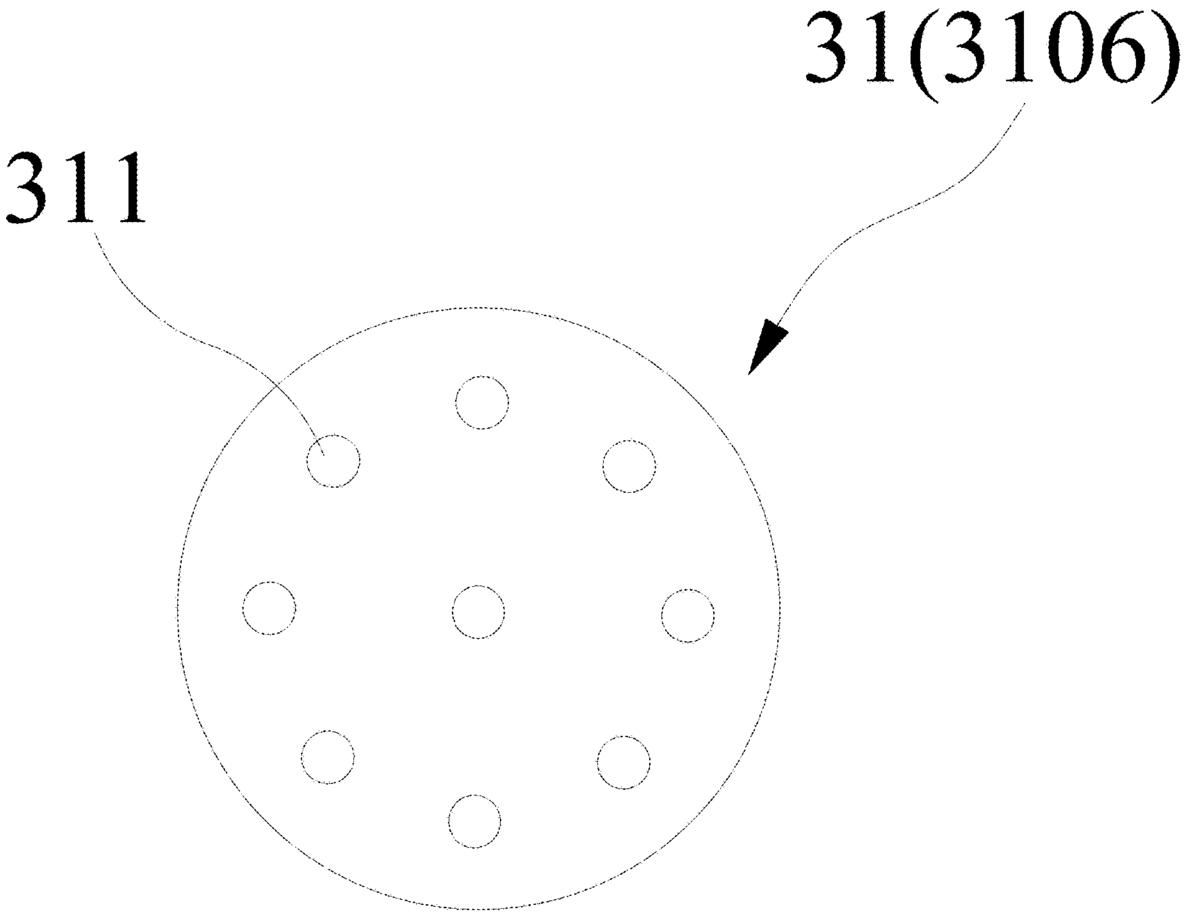
FIG. 19 is a partial close-up view of Part J in FIG. 13.

Referring to FIG. 11 through FIG. 19, the second embodiment of the present invention is similar to Embodiment 1 except for the pattern units 31 of the selector discs 3. Specifically, in the present embodiment, the selector disc 3 also has six pattern units 31. Therein, the first pattern unit 3101, the second pattern unit 3102, the third pattern unit 3103, the fourth pattern unit 3104, the fifth pattern unit 3105, and the sixth pattern unit 3106 each have multiple water outlet apertures 311. The first pattern unit 3101, the second pattern unit 3102, the third pattern unit 3103, the fourth pattern unit 3104, the fifth pattern unit 3105, and the sixth pattern unit 3106 have different numbers, arrangements, and diameters of water outlet apertures 311, so that the first pattern unit 3101, the second pattern unit 3102, the third pattern unit 3103, the fourth pattern unit 3104, the fifth pattern unit 3105, and the sixth pattern unit 3106 can produce six different spray patterns of the shower head.

The embodiments and drawings provided in the disclosure are not intended to limit the forms and makes of products according to the present invention. All appropriate alternations and modifications apparent to people having ordinary skill in the art shall be considered as not departing from the scope of the present invention.

What is claimed is:

1. A showering apparatus with spray holes each accommodating multiple spray patterns, the showering apparatus comprising: a main body, a control assembly, and a plurality of selector discs;

the main body including an outlet disc and a water passage plate that are connected, the outlet disc and the water passage plate jointly defining an outlet chamber therebetween, the outlet disc being formed with the spray holes;

each of the selector discs being rotatably fit inside the outlet chamber, and having at least two pattern units for providing different spray patterns, each of the pattern units in the selector disc being communicated with the outlet chamber, each of the selector discs being configured to correspond to one of the spray holes, and each of the pattern units in each of the selector discs being movably communicated with the spray hole corresponding to the selector disc;

the control assembly being assembled to the main body, the control assembly being transmissively connected to each of the selector discs, the control assembly driving each of the selector discs to rotate, so that each of the pattern units in each of the selector discs being selectively communicated with the spray hole corresponding to the selector disc.

2. The showering apparatus of claim 1, further comprising a sealing assembly sandwiched between the selector discs and the outlet disc.

3. The showering apparatus of claim 1, further comprising a sealing assembly sandwiched between each of the selector discs and the outlet disc.

4. The showering apparatus of claim 3, wherein the sealing assembly comprises a sealing band, and the sealing band of the sealing assembly sandwiched between each of the selector discs and the outlet disc encircles the spray hole corresponding to the selector disc.

5. The showering apparatus of claim 4, wherein the sealing assembly further comprises a sealing ring connected to the sealing band, and the sealing ring of the sealing assembly sandwiched between each of the selector discs and the outlet disc encircles a center of rotation of the selector disc.

6. The showering apparatus of claim 4, wherein the outlet disc has recesses for the sealing bands of the sealing assemblies to be partially inlaid therein.

7. The showering apparatus of claim 3, wherein an elastic retaining member is arranged between each of the selector discs and the water passage plate.

8. The showering apparatus of claim 7, wherein the elastic retaining member is a spring structure, and the selector disc has a retaining portion for being engaged with the elastic retaining member.

9. The showering apparatus of claim 1, wherein the outlet disc of the main body has a shaft for each of the selector discs, and each of the selector discs is rotatably mounted around the corresponding shaft.

10. The showering apparatus of claim 1, wherein each of the selector discs is peripherally formed with switch teeth, and each of the selector discs is engaged with the one or more selector discs adjacent to it through the switch teeth.

11. The showering apparatus of claim 10, wherein the control assembly is rotatably installed inside the main body, and the control assembly has a transmission portion formed with transmission teeth, so that the transmission portion of the control assembly is engaged with at least one of the selector discs through the switch teeth and the transmission teeth.

12. The showering apparatus of claim 11, further comprising a gear-positioning mechanism arranged between the main body and the control assembly; in which the gear-positioning mechanism comprises a spring-pin assembly incorporated in the control assembly and a plurality of gear slots formed on the main body, so that in response to relative rotation between the main body and the control assembly, the spring-pin assembly is engaged with each of the gear slots in position successively.

13. The showering apparatus of claim 11, wherein the outlet disc of the main body has an installation hole for the control assembly to pass therethrough rotatably and an elastic ring is fit between the control assembly and a wall of the installation hole.

14. The showering apparatus of claim 11, wherein the main body further comprises a water inlet plate connected to the outlet disc and the water passage plate, and the water inlet plate and the water passage plate jointly define an inlet chamber therebetween, in which the water inlet plate has a water inlet communicated with the inlet chamber and the water passage plate has a plurality of water passage holes communicating the inlet chamber with the outlet chamber.

* * * * *